United States Patent
Gopalan et al.

(10) Patent No.: US 10,598,058 B2
(45) Date of Patent: Mar. 24, 2020

(54) FLUIDIC PCV VALVE ASSEMBLY AND SYSTEM

(71) Applicant: DLHBOWLES, INC., Canton, OH (US)

(72) Inventors: Shridhar Gopalan, Westminster, MD (US); Jerry Thurber, Woodbine, MD (US)

(73) Assignee: DLHBOWLES, INC., Canton, OH (US)

( * ) Notice: Subject to any disclaimer, the term of this patent is extended or adjusted under 35 U.S.C. 154(b) by 0 days.

(21) Appl. No.: 16/578,627

(22) Filed: Sep. 23, 2019

(65) Prior Publication Data
US 2020/0018201 A1 Jan. 16, 2020

Related U.S. Application Data

(63) Continuation of application No. 15/933,773, filed on Mar. 23, 2018, now Pat. No. 10,422,258.

(Continued)

(51) Int. Cl.
*F01M 13/02* (2006.01)
*G05D 7/01* (2006.01)
(Continued)

(52) U.S. Cl.
CPC ...... *F01M 13/023* (2013.01); *F01M 13/0011* (2013.01); *F02M 25/06* (2013.01);
(Continued)

(58) Field of Classification Search
CPC ............ F01M 13/023; F01M 13/0011; F02M 35/10222; F02M 25/06; F02D 2250/08; G05D 7/0186
See application file for complete search history.

(56) References Cited

U.S. PATENT DOCUMENTS 4,210,113 A * 7/1980 Heffernan ............. F02M 23/09
123/41.86
4,270,508 A 6/1981 Lindberg
(Continued)

FOREIGN PATENT DOCUMENTS

EP 2098937 9/2009
GB 1177521 1/1970

OTHER PUBLICATIONS

European Patent Office; International Search Report and Written Opinion for International Application No. PCT/US2018/023949; dated Jun. 25, 2018.

*Primary Examiner* — Jacob M Amick
(74) *Attorney, Agent, or Firm* — McDonald Hopkins LLC

(57) ABSTRACT

Provided is a PCV valve assembly that includes a fluidic geometry that allows for the flow of combustion fluid/gas to flow between an inlet and an outlet and switch between two modes of operation, (i) a radial or high flow mode, and (ii) a tangential or low flow mode, as dictated during the operation of the engine. At low vacuums, the fluidic equipped PCV valve assembly has been tuned to operate in the radial mode producing high flow rates due to low flow resistance. As vacuum increases, the PCV valve assembly is tuned to automatically switch modes. This may be enabled due to the shape of the fluidic geometry and the bypass channel which is adapted to vary the amount of flow between a first and a second control ports. The bypass channel allows the geometric fluidic pattern to switch between the high flow mode and the low flow mode.

20 Claims, 13 Drawing Sheets

Related U.S. Application Data

(60) Provisional application No. 62/475,354, filed on Mar. 23, 2017.

(51) Int. Cl.
    *F02M 25/06*     (2016.01)
    *F01M 13/00*     (2006.01)
    *F02M 35/10*     (2006.01)

(52) U.S. Cl.
    CPC ..... *F02M 35/10222* (2013.01); *G05D 7/0186* (2013.01); *F02D 2250/08* (2013.01)

(56) References Cited

U.S. PATENT DOCUMENTS

| | | | |
|---|---|---|---|
| 5,027,784 | A | 7/1991 | Osawa |
| 8,070,424 | B2 | 12/2011 | Priestman |
| 2014/0034031 | A1 | 2/2014 | Wagner |
| 2014/0069399 | A1 | 3/2014 | Eckard |
| 2016/0265557 | A1* | 9/2016 | Fletcher ............... F04F 5/466 |

* cited by examiner

FLUIDIC PCV VALVE ASSEMBLY AND SYSTEM

CROSS-REFERENCE TO RELATED APPLICATIONS

This application is a continuation of U.S. patent application Ser. No. 15/933,773 entitled "FLUIDIC PCV VALVE ASSEMBLY AND SYSTEM," filed on Mar. 23, 2018, which claims priority to Provisional Patent Application No. 62/475,354 entitled "FLUIDIC EQUIPPED PCV GAS FLOW CONTROLLER AND CONDITION RESPONSIVE METHOD FOR CONTROLLING CRANKCASE GAS FLOW IN AN INTERNAL COMBUSTION ENGINE CRANKCASE," filed on Mar. 23, 2017, each of which are hereby incorporated by reference in their entirety.

FIELD OF INVENTION

The present invention relates to internal combustion engine crankcase gas flow rate control assembly and system and, more particularly, to a positive crankcase ventilation ("PCV") gas flow rate control assembly, system and components therefor.

BACKGROUND

The present invention relates to an internal combustion engine crankcase gas flow rate control assembly and system and, more particularly, to a positive crankcase ventilation ("PCV") gas flow rate control assembly and system for controlling the recirculation of gas discharge from an engine in accordance with engine operating conditions and also in accordance with flow rate adjustments made to the gas flow rate control system.

A PCV system provides a controlled mechanism for gases to escape the crankcase of an internal combustion engine. The heart of this system is the PCV valve, typically a single channel variable-restriction valve that can react to changing pressure values and intermittently vary flow rates while allowing the passage of the gases to their intended destination. In most modern vehicles the intended destination is the engine's intake stream.

Internal combustion inevitably involves a small but continual amount of blow-by gases, which will occur when some of the gases from the combustion leak past the piston rings to end up inside the crankcase. The gases could be vented through a simple hole or tube directly to the atmosphere, or they could "find their own way out" past baffles or past the oil seals of shafts or the gaskets of bolted joints. This is not a problem from a mechanical engineering viewpoint alone; but from other viewpoints, such as cleanliness for the user and environmental protection, such simple ventilation methods are not enough; escape of oil and gases must be prevented via a closed system that routes the escaping gases to the engine's intake stream and allows fresh air to be introduced into the crankcase for better and more efficient combustion.

From late in the 19th century through the early 20th century, blow-by gases were allowed to find their own way out past seals and gaskets in automotive vehicles. It was considered normal for oil to be found both inside and outside an engine, and for oil to drip to the ground in small but constant amounts. Bearing and valve designs generally made little to no provision for keeping oil or waste gases contained. In internal combustion engines, the hydrocarbon-rich blow-by gases would diffuse through the oil in the seals and gaskets into the atmosphere. Engines with high amounts of blow-by would leak profusely.

Until the early 1960s, automotive engines vented combustion gases directly to the atmosphere through a simple vent tube. Frequently, this consisted of a pipe (the 'road draft tube') that extended out from the crankcase down to the bottom of the engine compartment. The bottom of the pipe was open to the atmosphere, and was placed such that when the car was in motion a slight vacuum was obtained, helping to extract combustion gases as they collected in the crankcase. Oil mist would also be discharged, resulting in an oily film being deposited in the middle of each travel lane on heavily-used roads. The system was not "positive", as gases could travel both ways, or not move at all, depending on conditions.

Environmental concerns lead to the development of controlling combustion gases in an engine. The PCV valve and system operates as a variable and calibrated air leak whereby the engine returns its crankcase combustion gases. Instead of the gases being vented to the atmosphere, these gases are fed back into the intake manifold, re-entering the combustion chamber as part of a fresh charge of air and fuel. All the air collected by the air cleaner (and metered by the mass flow sensor, on a fuel injected engine) goes through the intake manifold. The PCV system diverts a small percentage of this air via the breather to the crankcase before allowing it to be drawn back into the intake tract again. The positive crankcase ventilation system is an "open system" in that fresh exterior air is continuously used to flush contaminants from the crankcase and draw them into the combustion chamber.

FIGS. 1A-1D illustrate a typical PCV system's use in an internal combustion engine. As illustrated in FIG. 1A and as described in U.S. Pat. No. 5,027,784, an internal combustion engine includes a cylinder head 1, a cylinder head cover 2, a cylinder block 3, and an oil pan 4. A typical prior art PCV system includes a PCV "vacuum" connection line 7 connecting the cylinder head cover 2 to a portion of an intake passage 8 of the internal combustion engine at a location downstream of a throttle valve 9. A PCV valve 6 is provided for controlling flow of blow-by gas in the PCV connection line 7. A baffle plate 12 provided in the cylinder head cover 2 acts as a primary trap for oil mist contained in the blow-by gas. A trap chamber 5 on the downstream or vacuum side of the PCV valve 6 serves as a secondary trap for oil mist in the blow-by gas. Oil mist trapped in the trap chamber 5 collects on a bottom wall 5' of the trap chamber 5.

During engine operation, blow-by gas which has leaked past a piston into a crankcase of the cylinder block 3, flows into the cylinder head cover 2 through a path formed in the cylinder block 3 and the cylinder head 1. The blow-by gas, controlled by the PCV valve 6, then flows through the PCV connection line 7 into the intake passage 8 of the engine to be burned in the combustion chamber.

The PCV system of FIG. 1A relies on the fact that, while the engine is running under light load and moderate throttle opening, the intake manifold's pressure is always less than crankcase pressure. The lower pressure of the intake manifold draws gases towards it, pulling air from the breather through the crankcase where the air is diluted and mixed with combustion gases through the PCV valve, and returned to the intake manifold. Typical PCV system PCV connection tubes (e.g., 7) connect the crankcase to a clean source of fresh air, namely, the air cleaner body. Usually, clean air from the air cleaner flows into this tube and into the engine after passing through a screen, baffle, or other simple system to arrest a flame front in order to prevent a potentially explosive atmosphere within the engine crankcase from being ignited from a backfire into the intake manifold. Once inside the engine, the air circulates around the interior of the engine, picking up and clearing away combustion byproduct gases, including any substantive amounts of water vapor which includes dissolved chemical combustion byproducts. The combined gases then exit through another simple baffle, screen, or mesh to trap oil droplets before being drawn out through the PCV valve 6 and into the intake manifold 8.

The typical PCV valve 6 is a simple mechanism with a few moving parts, as illustrated in FIGS. 1B, 1C, and 1D, but it performs a somewhat complicated gas flow control function. In some prior art PCV valve assemblies, an internal restrictor 13 (generally a piston or pintle) is held in "normal" (engine off, zero vacuum) position with a light spring 14, exposing the full size of the PCV opening to the intake manifold. With the engine running, the pintle is drawn towards the manifold side in the PCV valve by manifold vacuum, restricting the opening proportionate to the level of engine vacuum vs. spring force. At idle, the intake manifold vacuum is near maximum (as best seen in FIG. 1B). It is at this time the least amount of blow-by is actually occurring, so the PCV valve provides a large amount of (but not complete) restriction. As engine load increases, vacuum on the valve decreases proportionally and blow by increases proportionally. With a lower level of vacuum, the spring 14 returns the pintle 13 to the "open" position to allow more air flow. At full throttle (see, e.g., FIG. 1C), vacuum is much reduced, down to between 1.5 and 3 inches of Hg. At this point the PCV valve is essentially open and flowing, and most combustion gases escape via the "breather tube" where they are then drawn into the engine's intake manifold. Should the intake manifold's pressure be higher than that of the crankcase (which can happen in a turbocharged engine, or under certain conditions of use, such as an intake backfire, see, e.g., FIG. 1D), the PCV valve closes to prevent backflow into the crankcase.

In prior art PCV systems, the parts of the PCV system should be kept clean and open, otherwise air flow may be insufficient. A malfunctioning PCV valve may eventually damage an engine. Typical maintenance schedules for gasoline engines include PCV valve replacement whenever the air filter or spark plugs are replaced, because anything with moving parts inside may eventually fail.

Most gasoline powered internal combustion engines utilize PCV valves. The basic design of the PCV valve (as illustrated in FIGS. 1A-1D) has not changed much since its first introduction in passenger vehicles. The operating characteristics that define a PCV valve are: idle flow rate; cruise flow rate; transition vacuum level, and backfire-backflow prevention. Idle flow rate is the determination of the quantity of gas flowing through the PCV valve during high vacuum conditions existing when an engine is idling (See FIG. 1B). Cruise flow rate is the determination of the quantity of gas flowing through the PCV valve during low vacuum conditions when the engine is operating at higher rpm's during, for example, vehicle acceleration (See FIG. 1C). Transition vacuum level is the vacuum level at which the PCV valve switches from a low to a high flow rate, and backfire-backflow prevention is required in those rare situations where manifold pressure exceeds crankcase pressure (See FIG. 1D). A properly operating PCV valve should exhibit a decreasing flow curve with increasing vacuum, but a malfunctioning PCV valve can result in crankcase over pressure, oil sludge, oil leaks, poor fuel economy, rough idle and other problems.

In order to achieve the desired decreasing flow curve, most PCV valves employ a spring-pintle design as shown in FIGS. 1B-1D, and as a result, in most PCV valve designs, the flow passage is a variable annular area, which varies as the pintle moves linearly. The open lumen area defined by this annular opening can be as small as 0.25-0.3 mm and, in operation, the PCV valve assembly is prone to blockage from clogging. In addition, typical PCV valves such as those shown in FIGS. 1A-1D which have a spring/pintle assembly are also prone to sticking in one position or another.

It is an object of the present invention to overcome these problems and provide an improved, more durable and trouble-free PCV valve for use in an improved PCV system which will minimize the likelihood of sticking or clogging problems and enhance long term engine performance.

SUMMARY

The present disclosure describes a PCV valve assembly or flow controller which uses a fluidic geometry with control ports to reliably and precisely produce a decreasing flow rate output with increasing vacuum input. Historically, this type of output curve has only been achieved with use of condition responsive moving parts (e/g/. the pintle-spring assembly illustrated in FIGS. 1B-1D). In accordance with the structure and method of the present invention, excellent PCV performance is provided without moving parts to wear out or fail. As such, no pintle or biasing member exists in the PCV valve assembly of the present disclosure.

The PCV valve assembly may be referred to herein as a fluidic-equipped PCV valve flow controller. This assembly includes a fluidic geometry that allows for the flow of combustion gases to flow between an inlet and an outlet between two modes of operation, (i) a high flow or radial mode, and (ii) a low flow or tangential mode, as dictated during the operation of the engine. At low vacuums, the fluidic equipped PCV valve assembly has been tuned to operate in the radial mode producing high flow rates due to low flow resistance. As vacuum increase (e.g., to about 6" of Hg), the PCV valve assembly is tuned to automatically switch modes to tangential mode and the flow rate of gas therein drops. The particular switch set point value of the vacuum may be adjusted to various vacuum set points and this disclosure is not limited to the particular set point. The ability to switch from one mode to another is enabled or sensed via a bypass channel which controls two (first and second) control ports. It has been discovered that the bypass channel allows the geometric fluidic pattern to work in both the radial (high flow) mode and to self-switch to the tangential (low flow) mode.

The PCV valve assembly of the present disclosure provides a superior level of performance when incorporated in an engine's PCV system, as a substitute for prior art PCV valve 6. (See FIG. 1A). The PCV valve assembly utilizes a fluidic geometry defined in a first substantially planar substrate surface, where the fluidic geometry defines a PCV control channel with an inlet region in fluid communication with a crankcase gas inlet lumen. The PCV control channel inlet region may be in fluid communication with a steering chamber and a bypass lumen, each of which are in fluid communication with a substantially circular swirl chamber which has, at its center an outlet lumen configured for connection with a PCV connection line (e.g., 7 in FIG. 1A).

The fluidic-equipped PCV valve flow controlling device's two modes of operation-radial mode (high flow) and tangential mode (low flow) allow the device to operate in radial mode at low vacuum levels and switch automatically to tangential mode at higher vacuum levels (where threshold for the mode-switch is tunable for each engine or application). Tangential mode flow rate may be about 50% of the radial mode flow rate. As a result, the assembly exhibits a decreasing flow curve with increasing vacuum. Thus, flow rate drops at higher vacuum levels, and this performance is achieved with no moving parts. The above and still further objects, features and advantages of the present invention will become apparent upon consideration of the following detailed description of a specific embodiment thereof, particularly when taken in conjunction with the accompanying drawings, wherein like reference numerals in the various figures are utilized to designate like components.

In one embodiment, provided is a PCV valve assembly comprising a body defining a fluid passage. The fluid passage may be defined in the body and may include an inlet in communication with an inlet chamber including a first port, a power nozzle, and a second port. A interaction chamber downstream of the power nozzle, said interaction chamber including a radial interaction wall and a tangential interaction wall opposite from the radial interaction wall. A bypass channel in communication with the inlet chamber and the interaction chamber. A swirl chamber in communication with the interaction chamber and an outlet wherein the assembly may be configured to automatically switch between a low flow mode and a high flow mode based of fluid or gas flow through the fluid passage.

In high flow mode, fluid or gas may enter the inlet and traverse through the inlet chamber towards the interaction chamber and bypass channel towards the swirl chamber such that the fluid or gas may create a main flow, a secondary flow, and a tertiary flow. The main flow may traverse through the power nozzle and align along said radial interaction wall within the interaction chamber. The main flow may enter the swirl chamber and flow within the swirl chamber in a first direction. The secondary flow may traverse through a steering chamber and enter the interaction chamber and flow within the interaction chamber in a second direction opposite from the first direction and adjacent to the main flow. The tertiary flow may traverse through the steering chamber and the bypass channel and enter the swirl chamber and flow within the swirl chamber in a second direction opposite the first direction and adjacent the main flow.

The main flow may align along a first flow path axis as it traverses through the inlet chamber and may align along a second flow path axis as it traverses through the interaction chamber and enters into the swirl chamber, the second flow path axis may extend angularly from the first flow path axis. The PCV valve assembly may be tunable to automatically switch between the low flow mode and the high flow mode based on vacuum pressure at the inlet.

In low flow mode, fluid or gas may enter the inlet and traverse through the inlet chamber towards the interaction chamber and bypass channel towards the swirl chamber such that the fluid or gas may create a main flow and a secondary flow. The main flow may traverse through the power nozzle and align along said tangential interaction wall within the interaction chamber. The main flow may enter the swirl chamber and circulate in a second direction. The secondary flow may enter the interaction chamber and flow within the interaction chamber in a first direction adjacent to the main flow wherein the first direction is opposite from the second direction. The main flow may enter into the swirl chamber and be aligned along an outer wall of the swirl chamber and flow in a vortex shape before exiting the outlet. The main flow may also include fluid or gas flow that traverses through the bypass channel that becomes entrained with the main flow as it enters into the swirl chamber. The secondary flow may traverse within the interaction chamber along the radial interaction wall. The automatic switching between the high flow mode and the low flow mode may be enabled by the bypass channel which varies the flow between the first port and the second port.

In another embodiment, provided is a fluidic-equipped PCV valve flow controller comprising an inlet chamber having an inlet lumen and defining a first or left side flow path, a second or central flow path, and a third or right side flow path. An interaction chamber having a radial interaction wall and a tangential interaction wall opposite from the radial interaction wall. A swirl chamber having an outlet lumen configured for connection to a connection tube. A steering chamber having a first or left side curved sidewall opposing a second or right side straight sidewall, the steering chamber being in fluid communication with the central flow path and the interaction chamber. A bypass channel in fluid communication with the first flow path and the swirl chamber wherein the controller automatically switches between a low flow mode and a high flow mode based on vacuum pressure at the inlet chamber.

In high flow mode, fluid or gas enters the inlet and traverses through the inlet chamber towards the interaction chamber and bypass channel towards the swirl chamber such that the fluid or gas creates a main flow, a secondary flow, and a tertiary flow. The main flow enters the swirl chamber and flows within the swirl chamber in a first direction, the secondary flow traverses through said steering chamber and enters the interaction chamber and flows within the interaction chamber in a second direction opposite from the first direction and adjacent to the main flow, the tertiary flow traverses through the steering chamber and the bypass channel and enters the swirl chamber and flows within the swirl chamber in a second direction opposite the first direction and adjacent the main flow.

In low flow mode, fluid or gas enters the inlet and traverses through the inlet chamber towards the interaction chamber and bypass channel towards the swirl chamber such that the fluid or gas creates a main flow and a secondary flow. The main flow traverses through the power nozzle and aligns along said tangential interaction wall within the interaction chamber, said main flow enters the swirl chamber and circulates in a second direction, the secondary flow enters the interaction chamber and flows within the interaction chamber in a first direction adjacent to the main flow, and the main flow enters into the swirl chamber aligned along an outer wall of the swirl chamber.

In another embodiment, provide is a method for providing enhanced PCV performance in a system comprising the method steps of providing a PCV valve assembly with an inlet configured for connection to an engine's crankcase interior volume and an outlet configured for connection to a PCV connection/vacuum tube. Providing, in that PCV valve assembly, an inlet chamber, a first port, a power nozzle, a second port, steering chamber, a bypass channel, an interaction chamber and a swirl chamber. Introducing a flow of fluid or gas at the inlet to traverse through said PCV valve assembly to said outlet. Modifying a level of vacuum pressure at the inlet, and switching characteristics of the flow of fluid or gas between a high flow mode and a low flow mode.

BRIEF DESCRIPTION OF THE DRAWINGS

Operation of the present disclosure may be better understood by reference to the detailed description taken in connection with the following illustrations. These appended drawings form part of this specification, and any written information in the drawings should be treated as part of this disclosure. In the same manner, the relative positioning and relationship of the components as shown in these drawings, as well as their function, shape, dimensions, and appearance, may all further inform certain aspects of the present disclosure as if fully rewritten herein. In the drawings.

DETAILED DESCRIPTION

Figure 1A:
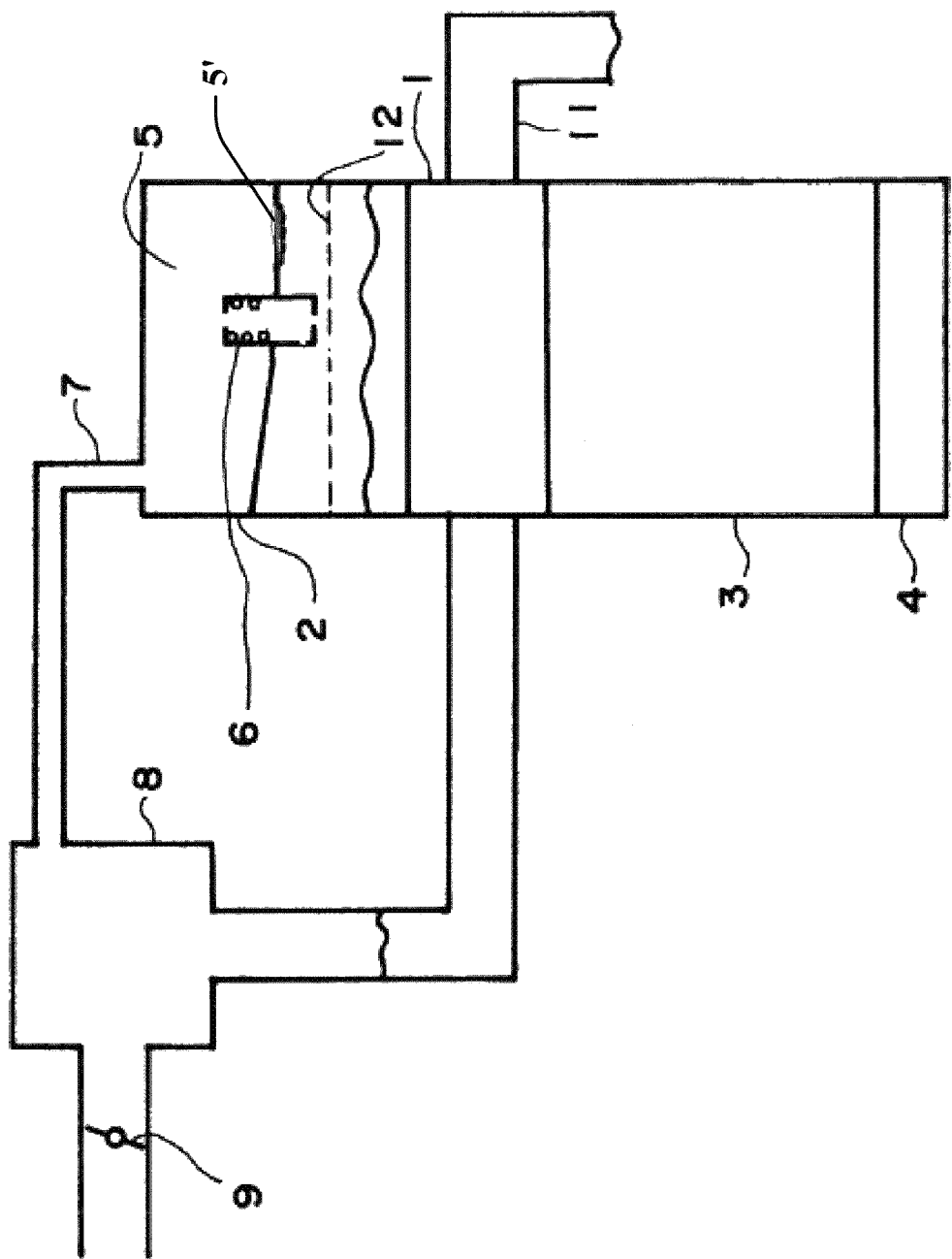
FIG. 1A is a schematic elevational view of a PCV system in accordance with the prior art.

Reference will now be made in detail to exemplary embodiments of the present disclosure, examples of which are illustrated in the accompanying drawings. It is to be understood that other embodiments may be utilized and structural and functional changes may be made without departing from the respective scope of the present disclosure. Moreover, features of the various embodiments may be combined or altered without departing from the scope of the present disclosure. As such, the following description is presented by way of illustration only and should not limit in any way the various alternatives and modifications that may be made to the illustrated embodiments and still be within the spirit and scope of the present disclosure.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Similar reference numerals are used throughout the figures. Therefore, in certain views, only selected elements are indicated even though the features of the assembly are identical in all of the figures. In the same manner, while a particular aspect of the invention is illustrated in these figures, other aspects and arrangements are possible, as will be explained below.

Referring also to FIGS. 2-9, provided is a PCV valve assembly or flow controller 100 that includes a fluidic geometry 110 defined to include control ports to reliably and precisely produce a decreasing flow rate output with increasing vacuum input. Historically, this type of output curve has only been achieved with use of condition responsive moving parts (e.g., the pintle-spring assembly shown in FIGS. 1B-1D). In accordance with the structure and method of the present invention, excellent PCV performance is provided with no moving parts to wear out or fail.

Figure 2:
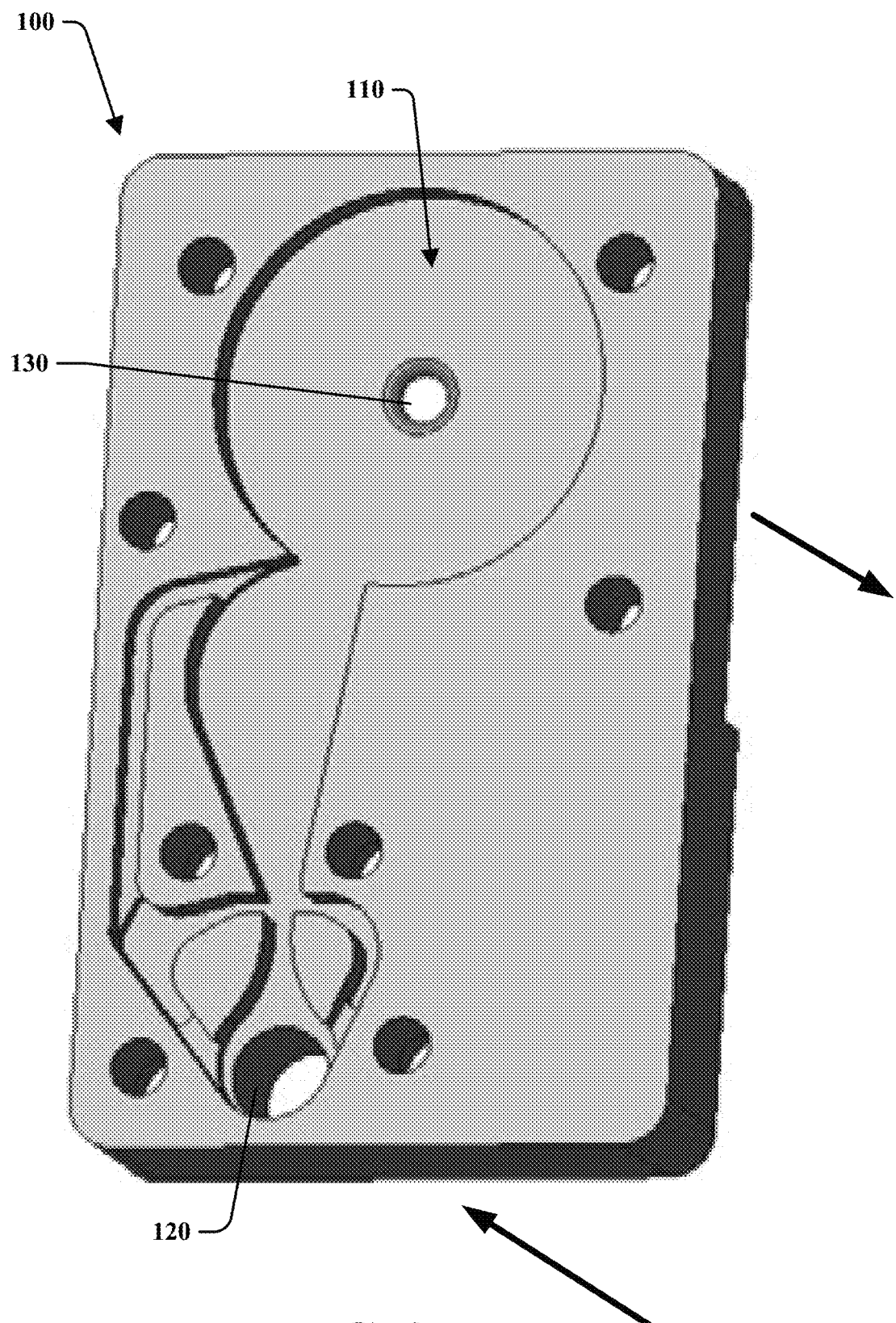
FIG. 2 illustrates a perspective view of an embodiment of a PCV valve assembly in accordance with the present disclosure.

Referring now to FIG. 2, the PCV valve assembly 100 includes an inlet 120 and an outlet 130. The inlet 120 may be in communication with the outlet 130 through the body of the PCV valve assembly 100 which may define contours shaped in a surface in a particular pattern that is tuned to allow for automatic mode switch as will be described. The contour geometry may be a fluidic pattern to allow for various gas or fluid flow therein.

The geometry includes an inlet chamber 122 that may define a first or left side flow path or via referred to as the tangential channel 124, a second or central flow path or via referred to as a power nozzle 126, and a third or right side flow path or via referred to as a radial channel 128. The inlet chamber 122 may include a large width adjacent the inlet 120 and a narrow width as it extends toward the power nozzle 126. The inlet chamber 122 may have an upside down wine glass shape where the tangential channel 124 and the radial channel 128 extend from a bulbous portion of the inlet chamber 122. The power nozzle 126 may be in communication with an interaction chamber 160.

The tangential channel 124 may extend from the inlet chamber 122 to a steering chamber 140. The steering chamber 140 branches from the inlet chamber 122 to a first or tangential port 142 and a bypass channel 150. The steering chamber may have a general kidney shape and be in fluid communication with the inlet chamber and a swirl chamber 180.

The radial channel 128 may extend to a second or radial port 144. The tangential port 142 and the radial port 144 may extend to and be reintroduced into a main flow path at a position within the fluidic geometry downstream from the power nozzle 126. This intersection may be referred to as a setback region 152 wherein the portion of the interaction chamber 160 adjacent the power nozzle 126 includes a width that is greater than a width of the power nozzle 126. The tangential port 142 and the radial port 144 may be on opposite sides of the power nozzle 126 and be aligned with each other on opposite sides of a first flow path axis 170. The first flow path axis 170 may extend longitudinally along the inlet chamber 122 through the power nozzle 126 and extend into the interaction chamber 160. The tangential channel 124 and tangential port 142 may include a shape that is generally asymmetric relative to the radial channel 128 and the radial port 144.

The interaction chamber may 160 be defined by a tangential interaction wall 162 and a radial interaction wall 164. The tangential interaction wall 162 may extend from the tangential port 142 and include a curved pattern wherein the tangential interaction wall 162 extends at a diverging angular position relative to the setback region 152 and first flow path axis 170 and then converge with a curved transition towards the first flow path axis 170. The radial interaction wall 164 may extend along an opposite side of the first flow path axis 170 from the tangential interaction wall 162. The radial interaction walls 164 may extend from the radial port 144 and include a short straight portion adjacent the radial port 144 and transition to a diverging angular portion that extends away from the first flow path axis 170 and is generally aligned with a second flow path axis 172 as identified in FIG. 3A. The tangential interaction wall 162 may include a shape that is generally asymmetric relative to the radial interaction wall 164. This asymmetry may be located at the walls that define the setback region 152 and extend along the walls downstream from the setback region 152.

The bypass channel 150 may extend from the steering chamber 140 and intersect with the interaction chamber 160 adjacent the swirl chamber 180. The bypass channel 150 may include a particular arrangement having a narrowing inner dimension as it extends from the steering chamber towards the interaction chamber 160.

The swirl chamber 180 may have a generally circular configuration and be in communication with the outlet 130. The outlet 130 may be positioned along a central portion of the swirl chamber 180 and be aligned along the second flow path axis 172. The swirl chamber 180 may be defined by an outer wall 182 that extends from an end of the radial interaction wall 164 of the interaction chamber 160 to an end of a bypass channel wall 154. The outlet 130 may be configured for connection to a PCV connection tube (not shown).

The outlet 130 may be offset from the inlet 120 to allow for the second flow path axis 172 to extend angularly from the first flow path axis to allow for the fluidic geometry of the PCV valve assembly to be tuned in a particular manner to automatically switch from various modes during operation as will be described below. The described configuration allows for two modes of operation, (a) high flow/radial mode (FIG. 3B) and (b) low flow/tangential mode (FIG. 3C), as dictated during the operation of the engine.

Figure 3A:
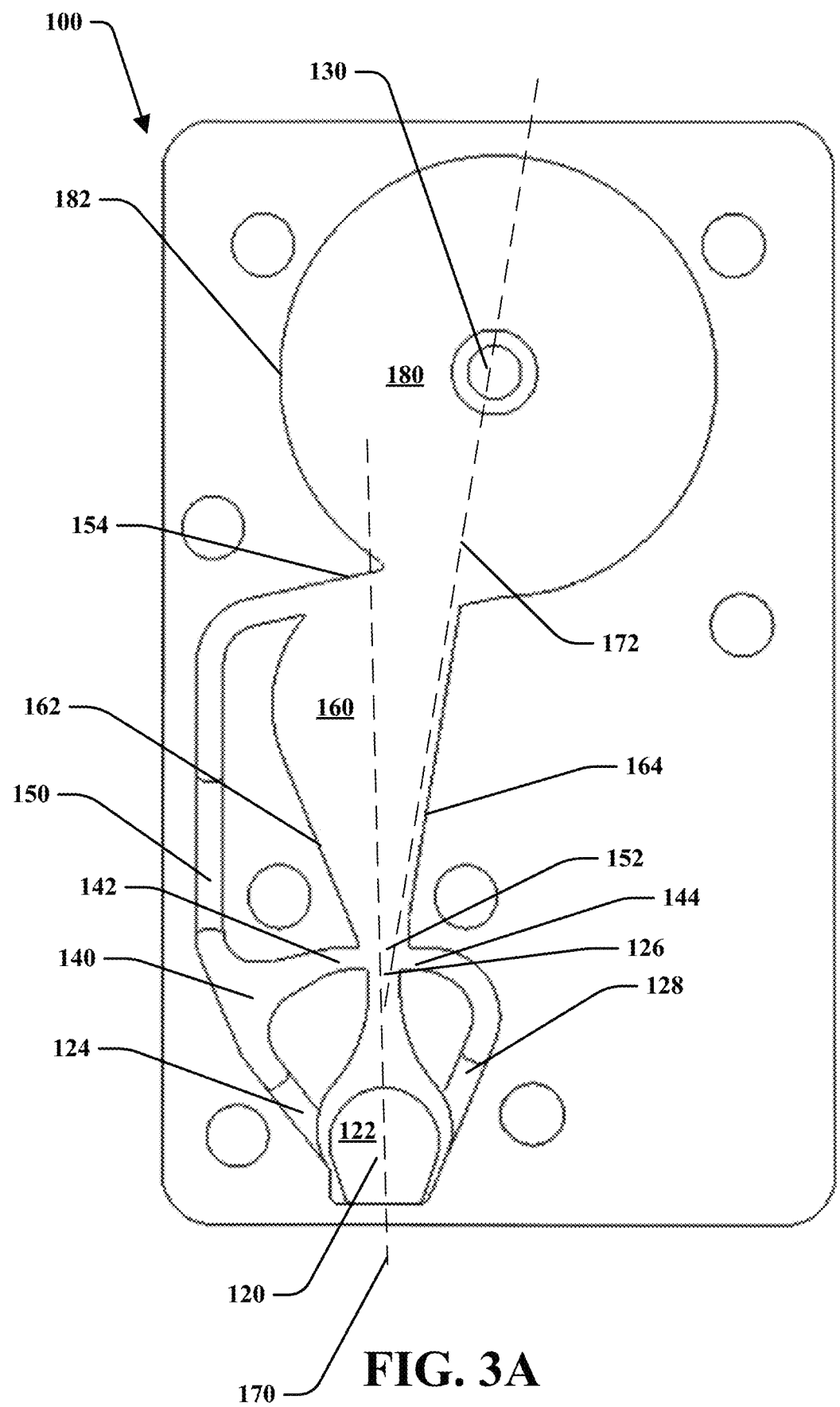
FIG. 3A is a plan view of an embodiment of the PCV valve assembly in accordance with the present disclosure.
Figure 3C:
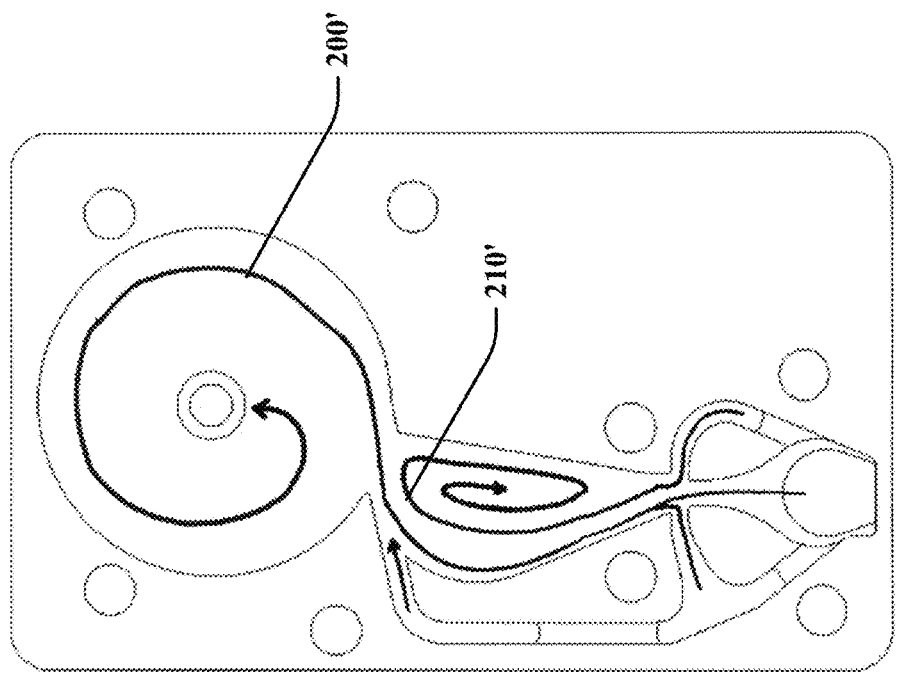
FIG. 3C is a plan view of an embodiment of the PCV valve assembly in tangential mode in accordance with the present disclosure.
Figure 3B:
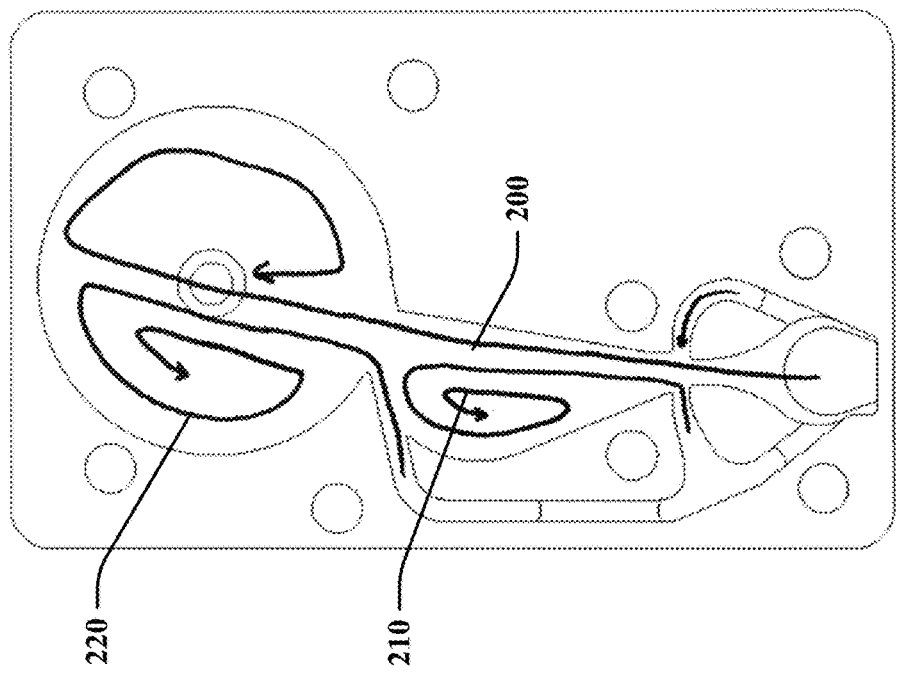
FIG. 3B is a plan view of an embodiment of the PCV valve assembly in radial mode in accordance with the present disclosure.
Figure 4:
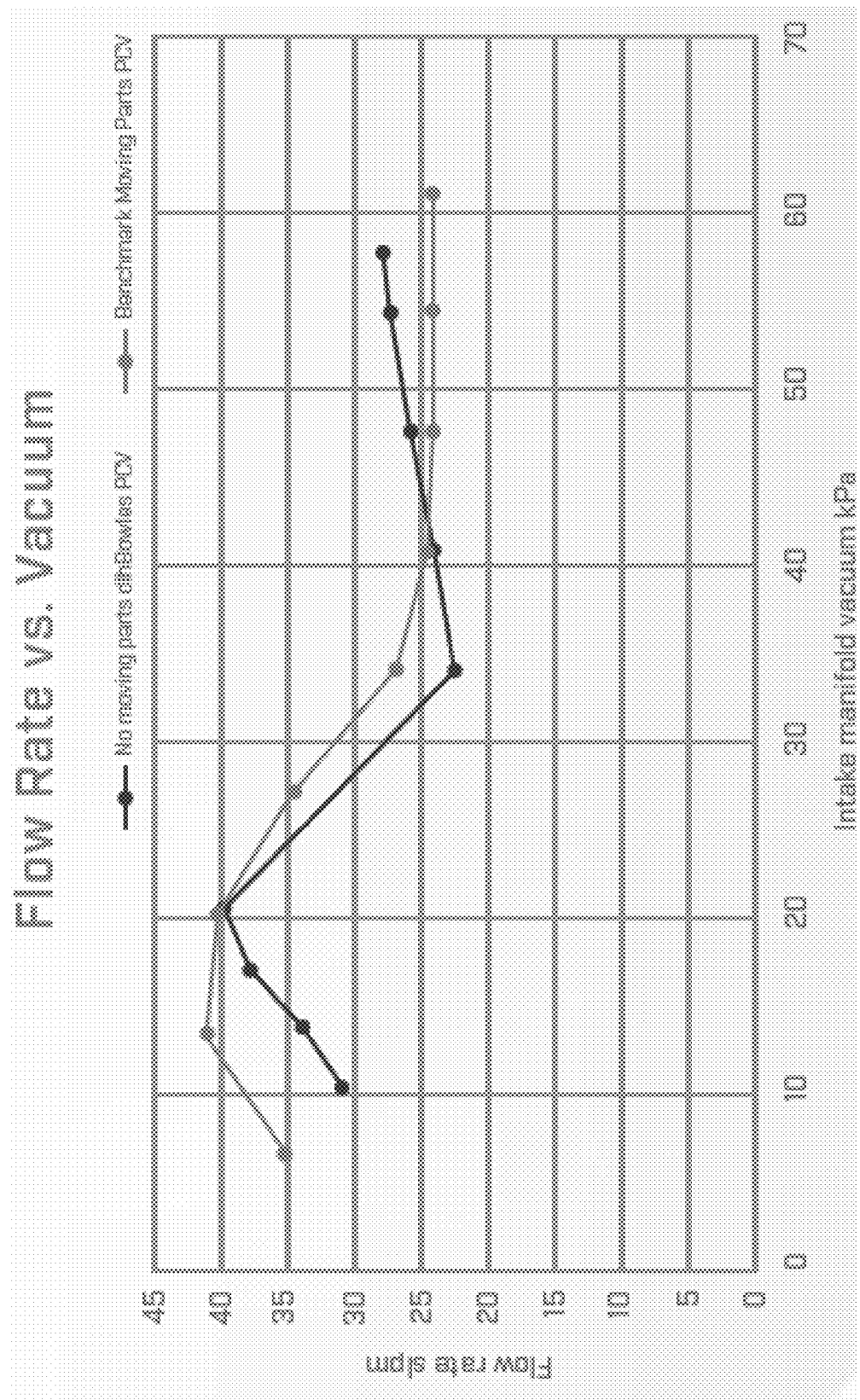
FIG. 4 is a graph illustrating comparative results of the PCV valve assembly of FIG. 2 versus a conventional PCV valve of the prior art having moving parts.
Figure 5:
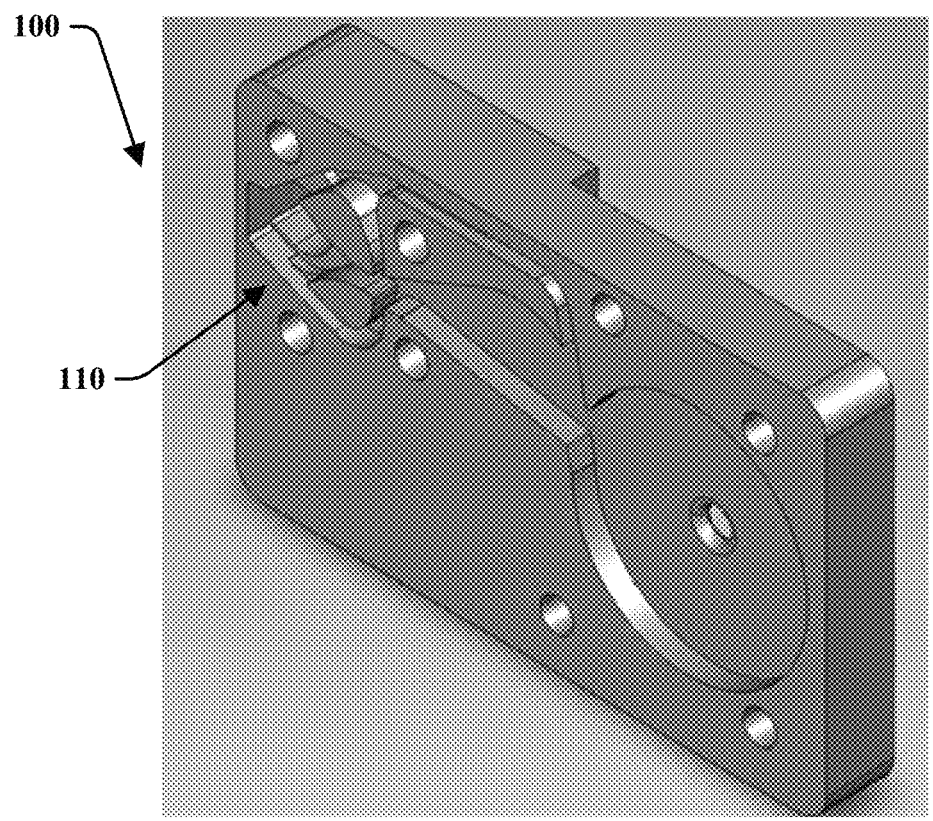
FIG. 5 is a front perspective view of an embodiment of the PCV valve assembly in accordance with the present disclosure.
Figure 6:
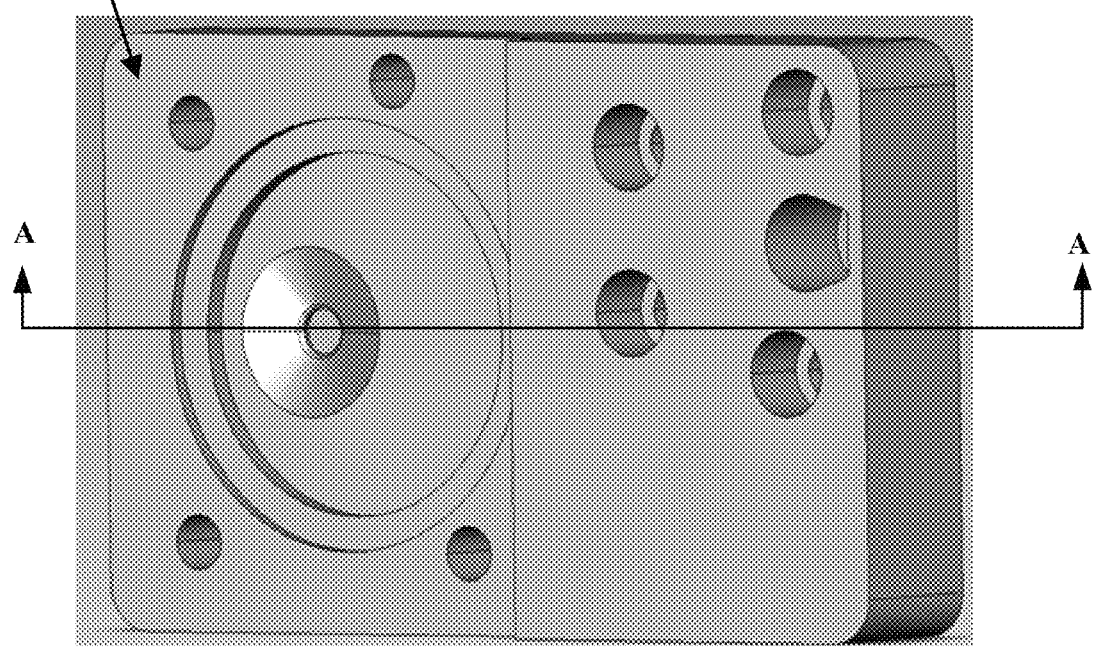
FIG. 6 is a rear perspective view of the PCV valve assembly of FIG. 5 in accordance with the present disclosure.
Figure 7:
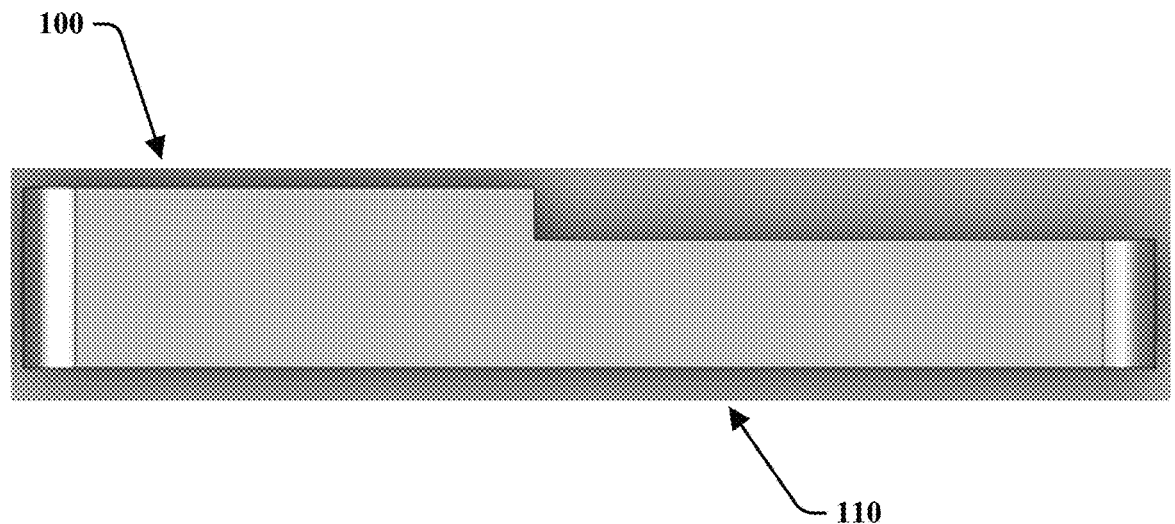
FIG. 7 is a side view of the PCV valve assembly of FIG. 5 in accordance with the present disclosure.

At low vacuums, the PCV valve assembly 100 may be tuned to operate in radial mode producing high flow rates (because of low flow resistance). In this mode, fluid or gas enters the inlet 120 and traverses through the inlet chamber 122 towards the tangential channel 124, power nozzle 126 and radial channel 128. The flow of fluid/gas may behave in a particular manner due to the interaction of the pressure and geometry of the fluidic pattern wherein a main flow 200, secondary flow 210 and tertiary flow 220 may be generated. The main flow 200, secondary flow 210 and tertiary flow 220 are illustrated in FIG. 3B by respective fluid or gas flow path lines. The main flow 200 generally traverses through the power nozzle 126 and aligns along the radial interaction wall 164 within the interaction chamber 160. The main flow 200 may generally align along the second flow path axis 172 (FIG. 2) as it may flow through the interaction chamber 160 and enter into the swirl chamber 180. The main flow 200 may extend within the swirl chamber 180 and traverse towards the opposite side of the outer wall 182 and then circulate in a clockwise orientation as illustrated by FIG. 3B. The secondary flow 210 may develop by traversing through the steering chamber 140 and entering into the interaction chamber 160 through the tangential port 142 adjacent the power nozzle 126. The secondary flow 210 may flow within the interaction chamber 160 in a generally counterclockwise configuration adjacent to the main flow 200. The tertiary flow 230 may develop by traversing through the steering chamber 140 and the bypass channel 150 and entering the swirl chamber 180. The tertiary flow 220 may traverse through the swirl chamber 180 adjacent the main flow 200 and flow in a counterclockwise orientation.

Further, during operation in radial mode, the secondary flow 210 may include a designated minimum flow of fluid or gas through the tangential channel 124 and tangential port 142 towards the left side of the interaction region 160 while the PCV valve assembly 100 is in radial mode. In this instance, the flow of fluid or gas from the radial channel 128 and radial port 144 would be less than the flow through the tangential channel 124 and tangential port 142. Further, the flow of fluid or gas through the power nozzle 126 may also be at a designated value to create a venturi effect to draw an increased amount of fluid or gas through the tangential port 142 and into the interaction region 160 than through the radial port 142. It may be desirable to tune the fluidic geometry to allow the flow of fluid or gas through the bypass channel 150 as well as the tangential port 142 into the interaction region 160 to maintain the fluidic circuit in the radial mode. Notably, if the flow of fluid or gas becomes greater through the radial channel 128 and radial port 144 than through the tangential port 142, the fluidic circuit will likely switch to tangential mode as no flow goes up to form the secondary flow 210 along the tangential interaction wall 162 in the interaction region 160 as this secondary flow 210 assists to maintain or position the main flow 200 against the radial interaction wall 164.

As vacuum increases (e.g., to about 6" of Hg), the PCV valve assembly may automatically switch modes to tangential mode and the flow rate drops. In this mode, the flow of fluid/gas may behave in a particular manner due to the interaction of the pressure and geometry of the fluidic pattern wherein a main flow 200' and secondary flow 210' may be generated. The main flow 200' and secondary flow 210' are illustrated in FIG. 3C by respective fluid or gas flow path lines. The main flow 200' generally traverses through the power nozzle 126 and aligns along the tangential interaction wall 162 within the interaction chamber 160. The main flow 200' may flow through the interaction chamber 160 and enter into the swirl chamber 180 aligned along the outer wall 182 and form into a swirl or vortex before exiting the outlet 130. The main flow 200 may also include fluid/gas flow that traverses through the bypass channel 150 that becomes entrained with the main flow 200' as it enters into the swirl chamber 180. The main flow 200' flows in a generally counterclockwise orientation within the swirl chamber 180 as illustrated by FIG. 3C. The secondary flow 210' may develop by traversing through the inlet chamber 122 and radial channel 128 and entering into the interaction chamber 160 through the radial port 144 and power nozzle 126. The secondary flow 210' may flow within the interaction chamber 160 in a generally clockwise configuration adjacent to the main flow 200' and generally along the radial interaction wall 164.

The need for switching from one mode to another is enabled or sensed via the bypass channel 150 which may control the flow through the tangential port 142 as it may be varied relative to the flow through the radial port 144. The flow through the radial port 144 may remain relatively constant while the flow through the tangential port 142 may be varied relative to the flow through the radial port 144 which may lead to the switch between the described modes.

During start up, the flow of fluid or gas in the radial channel 128 should be lower than the flow of fluid or gas in the tangential channel 124 to ensure that the assembly may be able to automatically switch between radial and tangential modes during operation. During operation, the flow of fluid or gas through the bypass channel 150 should be generally less than the flow of fluid or gas through the interaction chamber 160 to ensure that the assembly may be able to automatically switch between radial mode and tangential mode during operation.

Figures 1B, 1C, 1D:
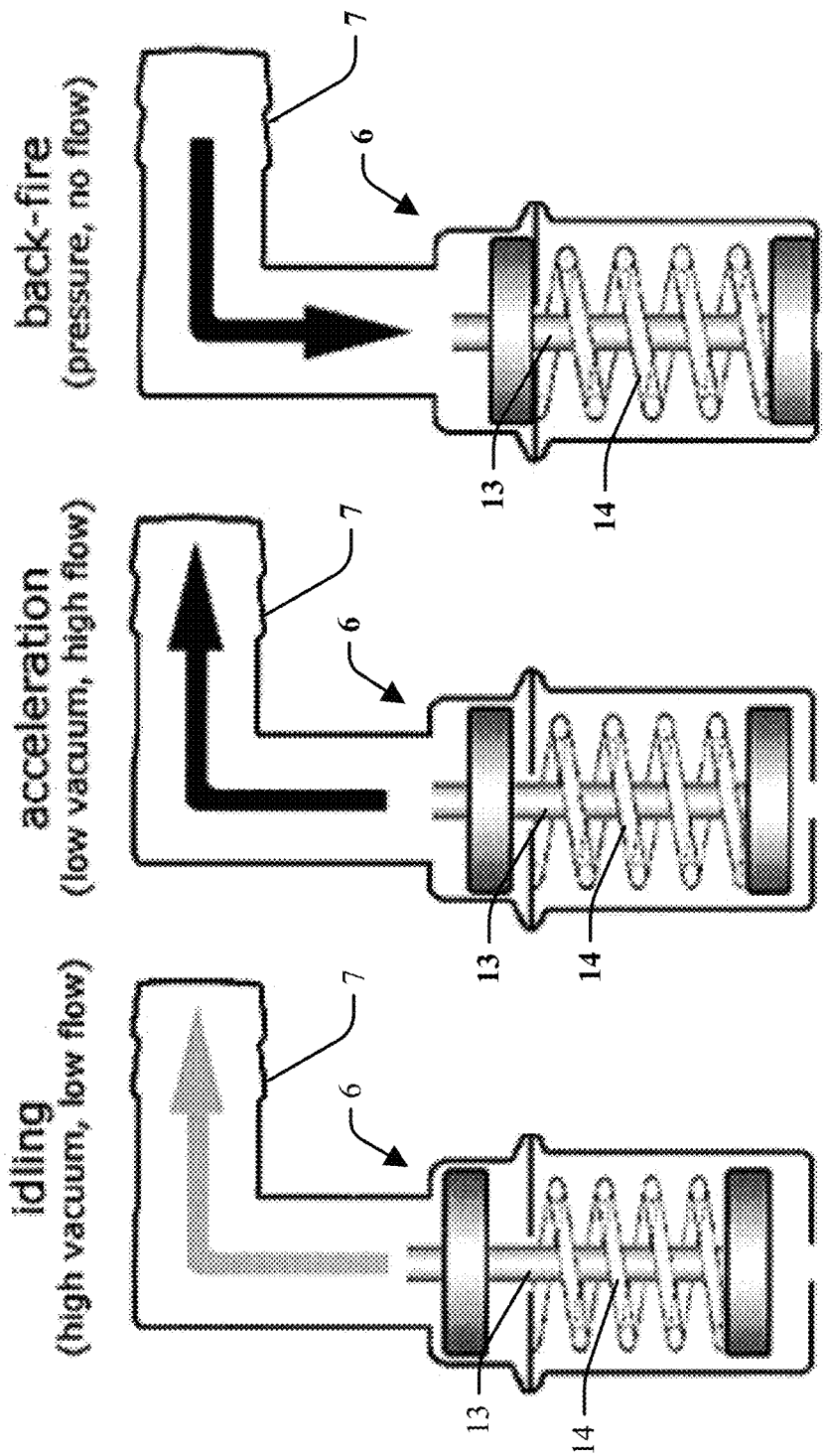
FIG. 1B is a schematic cross-sectional view of a prior art PCV system in an acceleration state whereby an engine returns its crankcase combustion gases to an inlet manifold via a PCV valve, in accordance with the prior art.
FIG. 1C is a schematic cross-sectional view of a prior art PCV system in an idling state whereby an engine returns its crankcase combustion gases to an inlet manifold via a PCV valve, in accordance with the prior art.
FIG. 1D is a schematic cross-sectional view of a prior art PCV system in a back-fire sate whereby an engine returns its crankcase combustion gases to an inlet manifold via a PCV valve, in accordance with the prior art.

The PCV valve assembly 100 may provide a superior level of performance when incorporated in an engine's PCV system (e.g., as a substitute for prior art PCV valve 6 to provide an improved PCV system as compared to the system of FIG. 1A). The PCV valve assembly utilizes fluidic geometry 110 defined in a first substantially planar substrate surface, where the fluidic geometry defines an inlet chamber in fluid communication with a crankcase gas inlet lumen. The inlet chamber may be in fluid communication with an outlet lumen configured for connection with a PCV connection line (e.g., item 7).

The device may operate in radial mode at low vacuum levels and automatically switch to tangential mode at higher vacuum levels. The threshold for the mode-switch may be tunable for each engine or application. Similarly, the assembly may operate in tangential mode at higher vacuum levels and may automatically switch to radial mode at lower vacuum levels. In one embodiment, the tangential mode flow rate may be about 50% of the radial mode flow rate (see, e.g., plotted performance data of FIG. 4). This graph illustrates that the PCV valvue assembly exhibits a decreasing flow curve with increasing vacuum with no moving parts or small clog prone passages. The graph exhibits the radial or high flow mode up to about 30 kilopascal ("kPA") and exhibits tangential or low flow mode from about 30 kPa upwards. In this embodiment, the transition from radial to tangential mode occurs between about 30 kPa and 40 kPa. Additionally, radial mode exhibits a flow rate between about 25 standard liter per minute ("slpm") to about 45 slpm while tangential mode exhibits a flow rate between about 20 slpm to about 30 slpm. As a result flow rate drops at higher vacuum levels as measured from the intake manifold, and this performance is achieved with no moving parts such as a biasing member or pintle.

Figure 8:
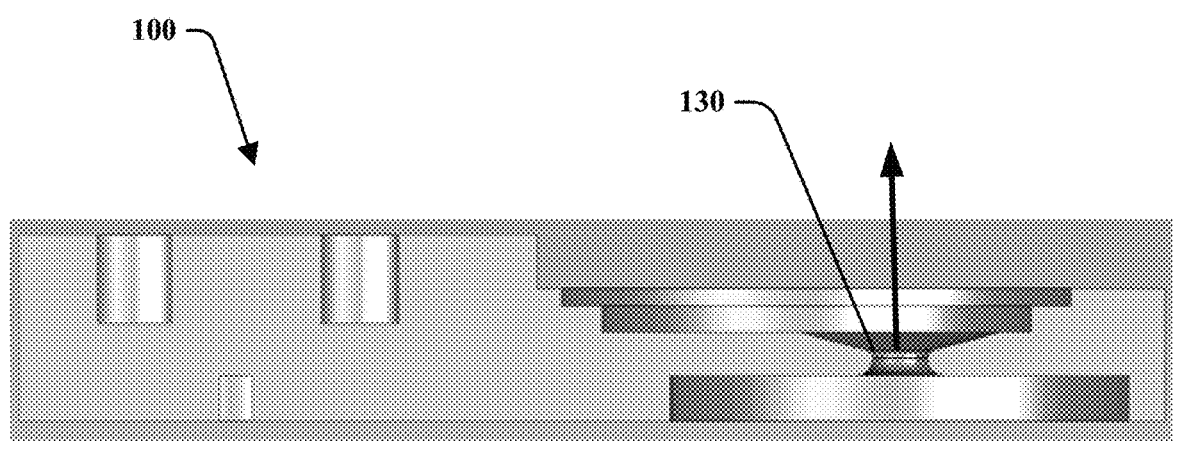
FIG. 8 is a cross sectional view of along line A-A the PCV valve assembly of FIG. 6 in accordance with the present disclosure.
Figure 9:
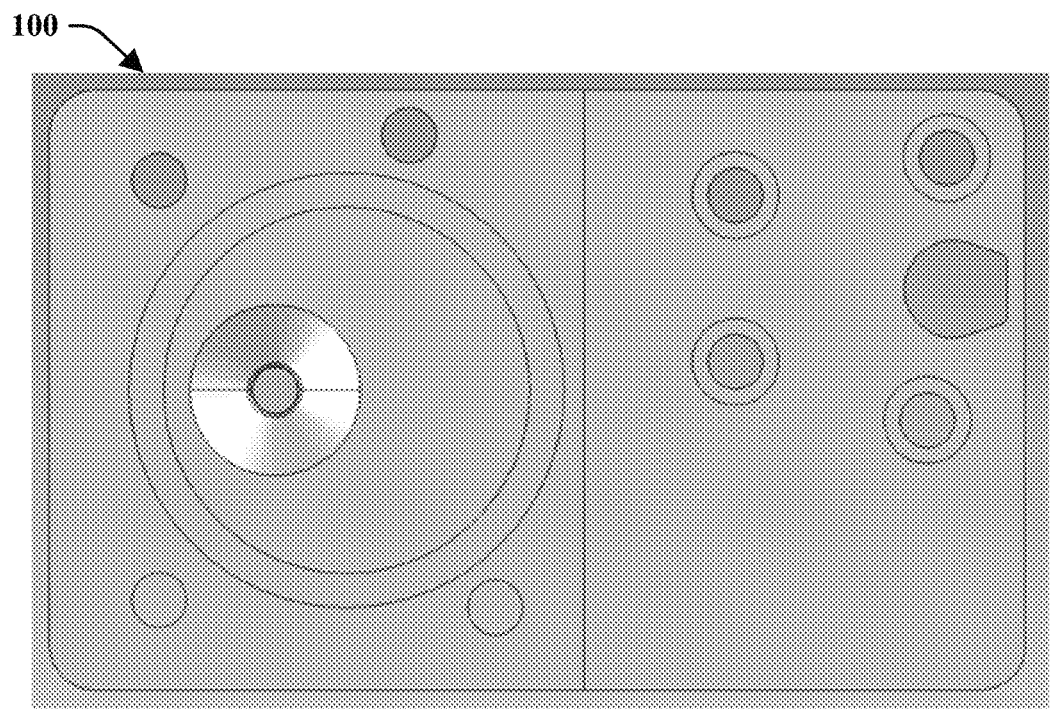
FIG. 9 is a rear view of the PCV valve assembly of FIG. 5 in accordance with the present disclosure.
Figure 10:
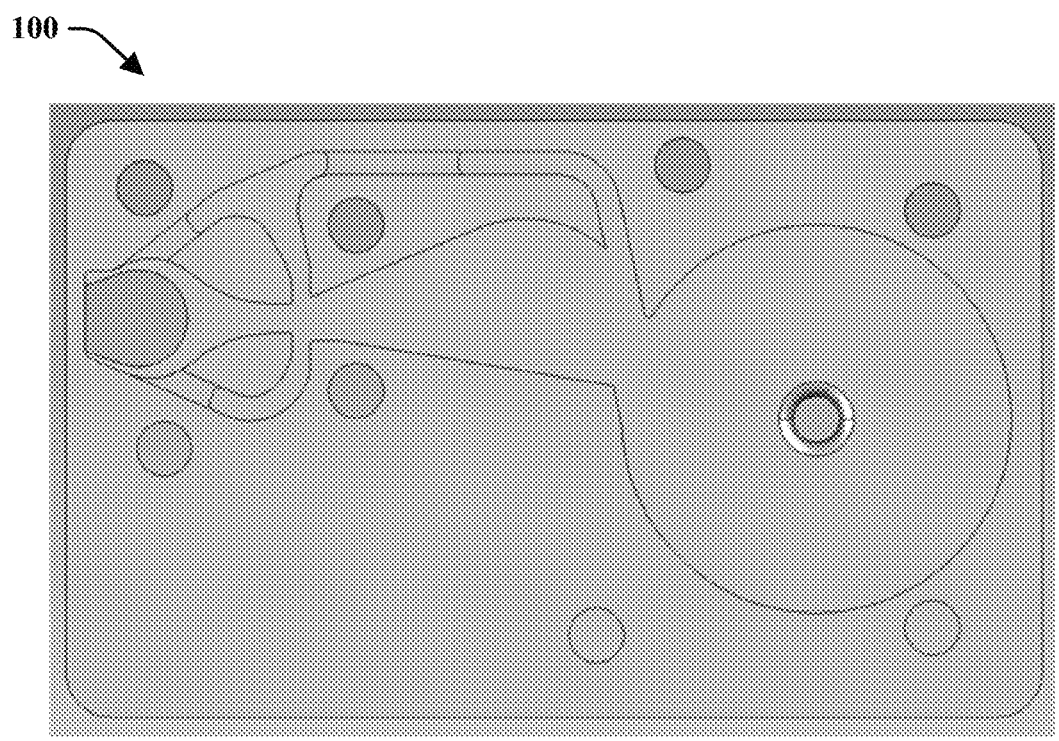
FIG. 10 is a front view of the PCV valve assembly of FIG. 5 in accordance with the present disclosure.
Figure 11:
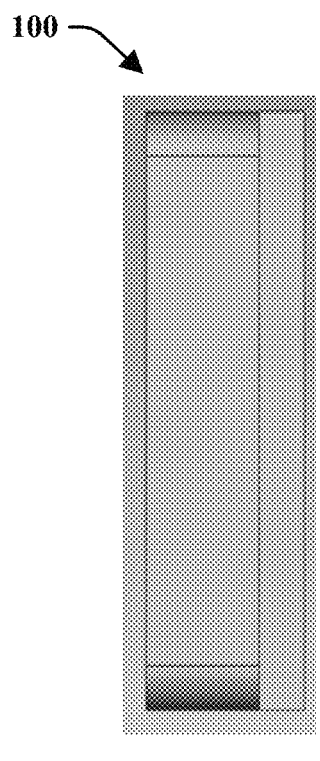
FIG. 11 is a first end view of the PCV valve assembly of FIG. 5 in accordance with the present disclosure.
Figure 12:
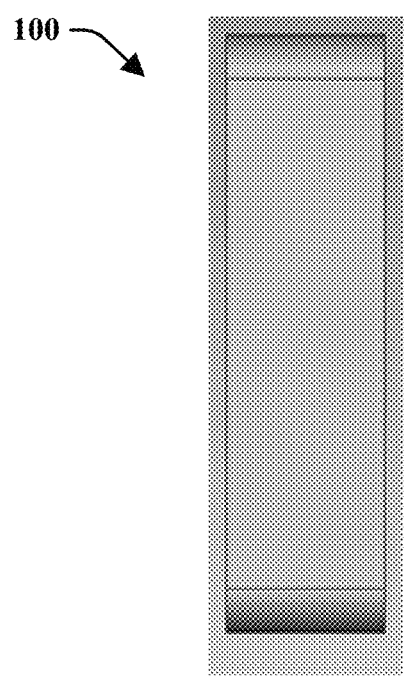
FIG. 12 is a second end view of the PCV valve assembly of FIG. 5 in accordance with the present disclosure.
Figure 13:
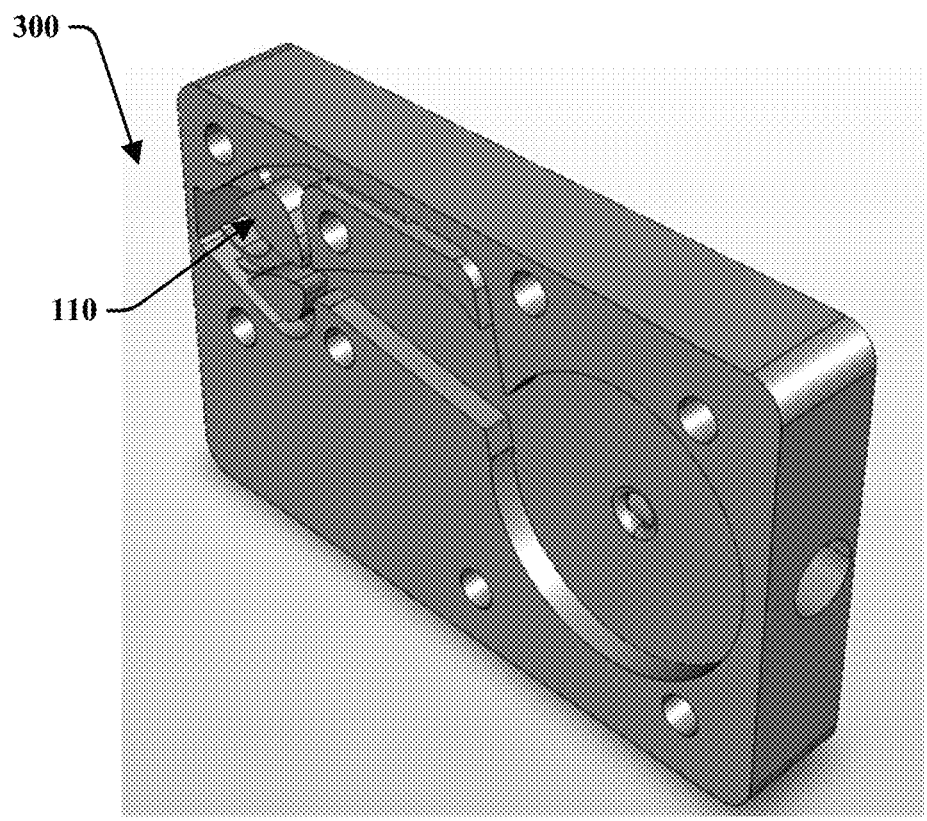
FIG. 13 is a front perspective view of another embodiment of the PCV valve assembly in accordance with the present disclosure.
Figure 14:
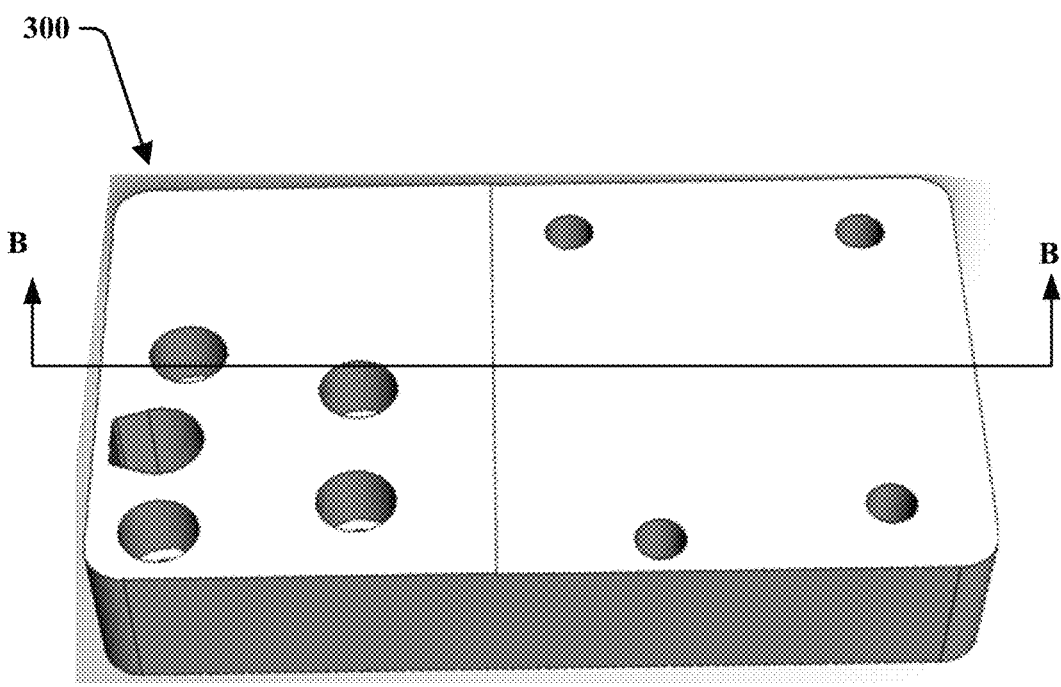
FIG. 14 is a rear perspective view of the PCV valve assembly of FIG. 5 in accordance with the present disclosure.
Figure 15:
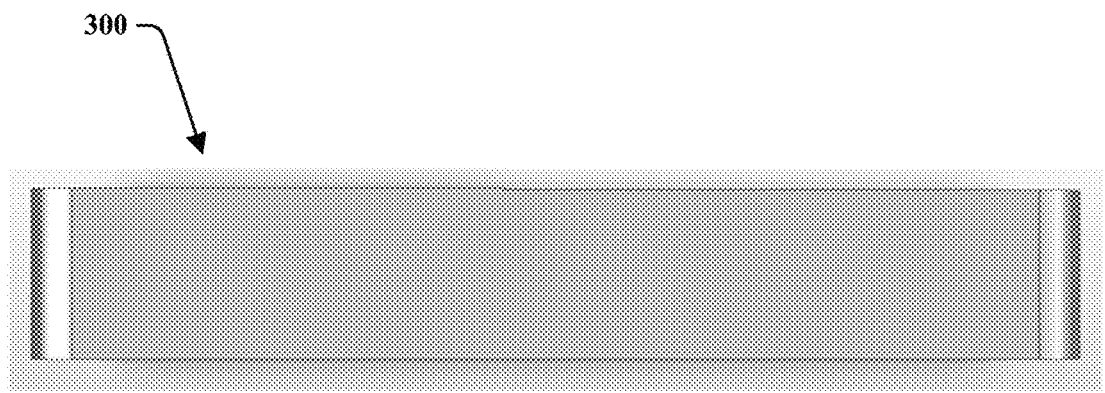
FIG. 15 is a side view of the PCV valve assembly of FIG. 13 in accordance with the present disclosure.

FIGS. 5 through 12 are provided to illustrate the various sides of a body that includes the fluidic geometry of the PCV valve assembly formed therein. Notably, a cap or surface (not shown) may be attached to the body of the PCV valve assembly to create a fluidic passage with the fluidic geometry formed on the body and to define the inlet and outlet connections within a system (i.e. such as a combustion engine system). Apertures positioned outside the fluidic geometry 110 may be used to attach the cap or separate surface (not shown) to the PCV valve assembly. FIG. 8 illustrates a cross section view through line A-A of FIG. 6 and shows that the outlet may allow flow in a direction through a back side of the body. Notably, this allows for a generally offset and parallel connection between an inlet lumen attached to the inlet 120 and an outlet lumen attached to the outlet 130.

Figure 16:
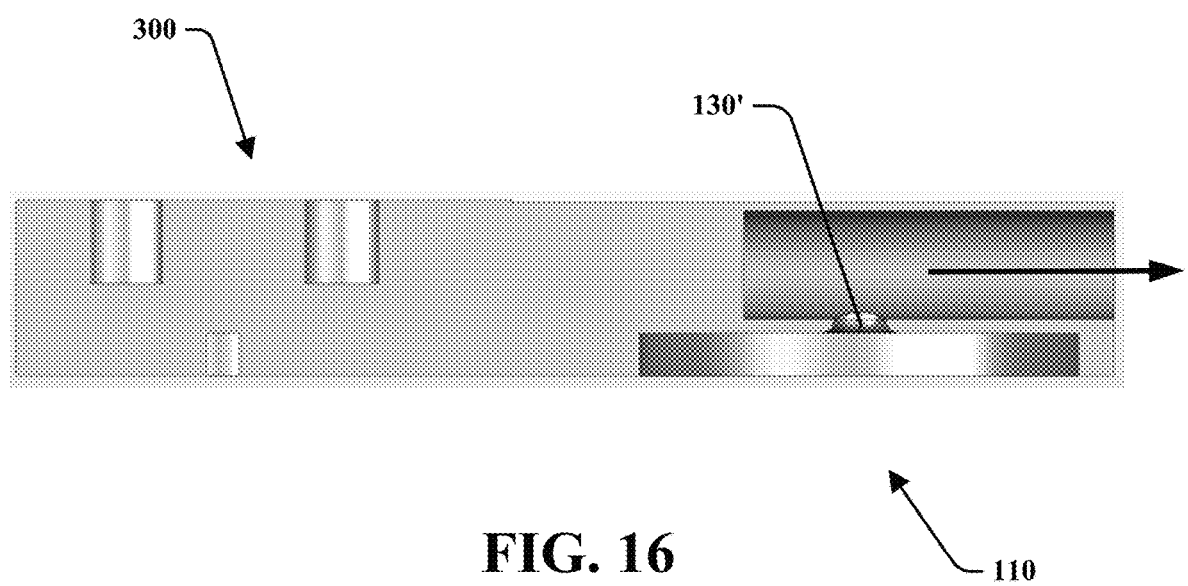
FIG. 16 is a cross sectional view of along line B-B the PCV valve assembly of FIG. 14 in accordance with the present disclosure.
Figure 17:
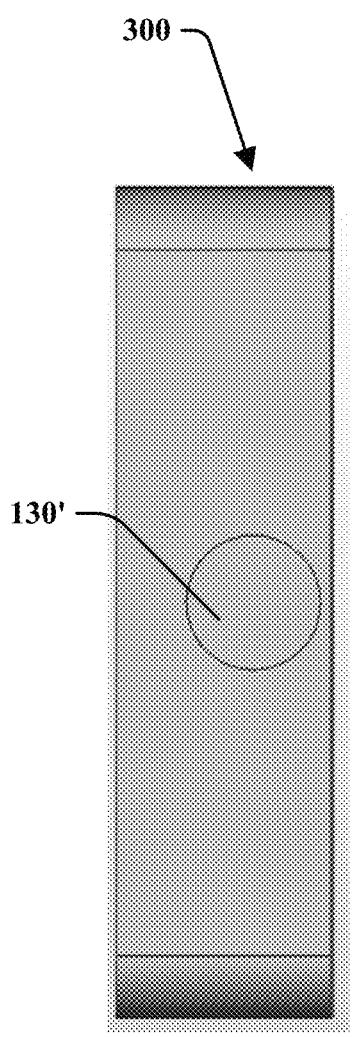
FIG. 17 is a first end view of the PCV valve assembly of FIG. 13 in accordance with the present disclosure.
Figure 18:
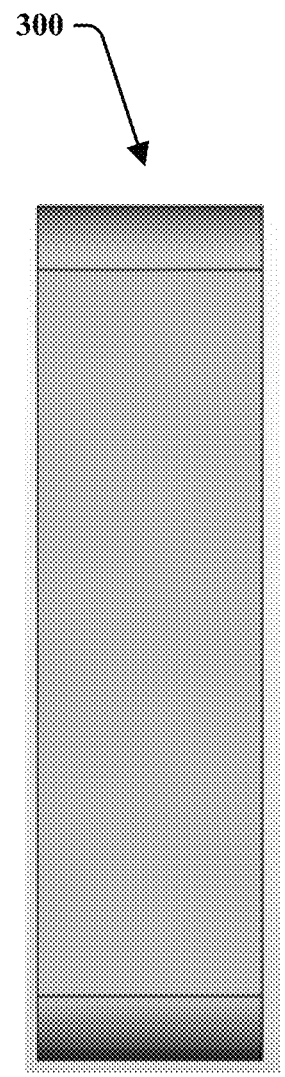
FIG. 18 is a second end view of the PCV valve assembly of FIG. 13 in accordance with the present disclosure.

FIGS. 13 through 18 are provided to illustrate the various sides of another embodiment of the PCV valve assembly 300. In this embodiment, the body includes the fluidic geometry formed therein. Additionally, an outlet 130' extends from the swirl chamber 180 and exits from an end portion of the body as can be seen by FIG. 16. FIG. 16 illustrates a cross section view through line B-B of FIG. 14 and shows that the outlet may allow flow in a direction through an end portion of the body. Notably, this allows for a generally offset and perpendicular connection between an inlet lumen attached to the inlet 120 and an outlet lumen attached to the outlet 130'. However, there may be various other arrangements regarding the configuration of the PCV valve assembly 100, 300 and this disclosure is not limited.

In one embodiment, the length of the body of the PCV valve assembly 100, 300 may be approximately 65 mm long and allow for a maximum flow rate of fluid or gas therein to be about 42 1 pm at 21 kpa (vacuum). In one embodiment, the outlet 130, 130' may have a diameter of about 1.5 mm.

Although the embodiments of the present disclosure have been illustrated in the accompanying drawings and described in the foregoing detailed description, it is to be understood that the present disclosure is not to be limited to just the embodiments disclosed, but that the present disclosure described herein is capable of numerous rearrangements, modifications and substitutions without departing from the scope of the claims hereafter. The claims as follows are intended to include all modifications and alterations insofar as they come within the scope of the claims or the equivalent thereof.

Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A valve assembly comprising:
   a body defining a fluid passage comprising:
      an inlet in communication with an inlet chamber including a first port, a power nozzle, and a second port;
      a interaction chamber downstream of the power nozzle; said interaction chamber including a radial interaction wall and a tangential interaction wall opposite from the radial interaction wall;

a bypass channel in communication with the inlet chamber and the interaction chamber;

a swirl chamber in communication with the interaction chamber and an outlet;

wherein the assembly is configured to automatically switch between a low flow mode and a high flow mode based of fluid or gas flow through the fluid passage.

2. The valve assembly of claim 1, wherein in high flow mode, fluid or gas enters the inlet and traverses through the inlet chamber towards the interaction chamber and bypass channel towards the swirl chamber such that the fluid or gas creates a main flow, a secondary flow, and a tertiary flow.

3. The valve assembly of claim 2, wherein said main flow traverses through the power nozzle and aligns along a radial interaction wall within the interaction chamber.

4. The valve assembly of claim 3, wherein said main flow enters the swirl chamber and flows within the swirl chamber in a first direction, the secondary flow traverses through a steering chamber and enters the interaction chamber and flows within the interaction chamber in a second direction opposite from the first direction and adjacent to the main flow, the tertiary flow traverses through the steering chamber and the bypass channel and enters the swirl chamber and flows within the swirl chamber in a second direction opposite the first direction and adjacent the main flow.

5. The valve assembly of claim 2, wherein said main flow aligns along the first flow path axis as it traverses through the inlet chamber and aligns along a second flow path axis as it traverses through the interaction chamber and enters into the swirl chamber, the second flow path axis extends angularly from the first flow path axis.

6. The valve assembly of claim 1, wherein the assembly is tunable to automatically switch between the low flow mode and the high flow mode based on vacuum pressure at the inlet.

7. The valve assembly of claim 1, wherein in low flow mode, fluid or gas enters the inlet and traverses through the inlet chamber towards the interaction chamber and bypass channel towards the swirl chamber such that the fluid or gas creates a main flow and a secondary flow.

8. The valve assembly of claim 7, wherein said main flow traverses through the power nozzle and aligns along said tangential interaction wall within the interaction chamber.

9. The valve assembly of claim 8, wherein said main flow enters the swirl chamber and circulates in a second direction, the secondary flow enters the interaction chamber and flows within the interaction chamber in a first direction adjacent to the main flow.

10. The valve assembly of claim 8, wherein the main flow enters into the swirl chamber aligned along an outer wall of the swirl chamber.

11. The valve assembly of claim 10, wherein the main flow also include fluid or gas flow that traverses through the bypass channel that becomes entrained with the main flow as it enters into the swirl chamber.

12. The valve assembly of claim 9, wherein the secondary flow traverses within the interaction chamber along the radial interaction wall.

13. The valve assembly of claim 1, wherein automatic switching between the high flow mode and the low flow mode is enabled by the bypass channel which varies the flow between the first port and the second port.

14. A fluidic-equipped-valve flow controller comprising:
(a) an inlet chamber having an inlet lumen and defining a first or left side flow path, a second or central flow path, and a third or right side flow path;
(b) a interaction chamber having a radial interaction wall and a tangential interaction wall opposite from the radial interaction wall;;
(c) a swirl chamber having an outlet lumen configured for connection to a connection tube;
(d) a steering chamber having a first or left side curved sidewall opposing a second or right side straight sidewall, the steering chamber being in fluid communication with the central flow path and the interaction chamber;
(e) a bypass channel in fluid communication with the first flow path and the swirl chamber;
wherein the controller automatically switches between a low flow mode and a high flow mode based on vacuum pressure at the inlet chamber.

15. The fluidic-equipped valve flow controller of claim 14, wherein in high flow mode, fluid or gas enters the inlet and traverses through the inlet chamber towards the interaction chamber and bypass channel towards the swirl chamber such that the fluid or gas creates a main flow, a secondary flow, and a tertiary flow.

16. The fluidic-equipped valve flow controller of claim 15, wherein said main flow enters the swirl chamber and flows within the swirl chamber in a first direction, the secondary flow traverses through said steering chamber and enters the interaction chamber and flows within the interaction chamber in a second direction opposite from the first direction and adjacent to the main flow, the tertiary flow traverses through the steering chamber and the bypass channel and enters the swirl chamber and flows within the swirl chamber in a second direction opposite the first direction and adjacent the main flow.

17. The fluidic-equipped valve flow controller of claim 14, wherein in low flow mode, fluid or gas enters the inlet and traverses through the inlet chamber towards the interaction chamber and bypass channel towards the swirl chamber such that the fluid or gas creates a main flow and a secondary flow.

18. The fluidic-equipped valve flow controller of claim 17, wherein said main flow traverses through the power nozzle and aligns along said tangential interaction wall within the interaction chamber, said main flow enters the swirl chamber and circulates in a second direction, the secondary flow enters the interaction chamber and flows within the interaction chamber in a first direction adjacent to the main flow, and the main flow enters into the swirl chamber aligned along an outer wall of the swirl chamber.

19. A method for providing enhanced performance in a system comprising the method steps of:
(a) providing a valve assembly with an inlet configured for connection to an engine's crankcase interior volume and an outlet configured for connection to a connection/vacuum tube;
(b) providing, in that valve assembly, an inlet chamber, a first port, a power nozzle, a second port, steering chamber, a bypass channel, a interaction chamber and a swirl chamber; and
(c) introducing a flow of fluid or gas in the inlet to traverse through said valve assembly to said outlet.

20. The method of claim 19, further comprising:
modifying a level of vacuum pressure at the inlet; and
switching characteristics of the flow of fluid or gas between a high flow mode and a low flow mode.

* * * * *